(12) United States Patent
Noguchi et al.

(10) Patent No.: US 8,683,491 B2
(45) Date of Patent: Mar. 25, 2014

(54) INFORMATION PROCESSING APPARATUS, EXECUTION METHOD, AND OBJECT PROGRAM

(75) Inventors: Masato Noguchi, Kanagawa (JP); Yoshiroh Kamiyama, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 12/775,913

(22) Filed: May 7, 2010

(65) Prior Publication Data

US 2010/0293556 A1    Nov. 18, 2010

(30) Foreign Application Priority Data

May 15, 2009    (JP) .................................. 2009-118654

(51) Int. Cl.
*G06F 13/00*    (2006.01)
*G06F 9/44*    (2006.01)

(52) U.S. Cl.
USPC ........... 719/318; 717/162; 717/163; 717/164; 717/165; 717/166

(58) Field of Classification Search
None
See application file for complete search history.

(56) References Cited

U.S. PATENT DOCUMENTS

| 2003/0154207 A1 | 8/2003 | Naito | |
| 2005/0120306 A1* | 6/2005 | Klassen et al. ................ | 715/765 |
| 2008/0307435 A1* | 12/2008 | Rehman ....................... | 719/318 |

FOREIGN PATENT DOCUMENTS

| JP | 2001-136556 A | 5/2001 |
| JP | 2009-241879 | 10/2009 |

* cited by examiner

*Primary Examiner* — H S Sough
*Assistant Examiner* — Phuong Hoang
(74) *Attorney, Agent, or Firm* — Steven Greenberg, Esq.; CRGO Law

(57) ABSTRACT

There is provided an information processing apparatus including a message storage unit for storing a message sent to a component, and an execution processing unit for loading the component body into a computer in response to receiving an execution instruction on the component to execute the component body and process the message stored in the message storage unit prior to the execution instruction.

12 Claims, 14 Drawing Sheets

200

```
// LayoutContainer - Container that manages multiple display frames (LayoutPane)
//     Runs the component in the "hide state" first time
//     that is :
//         • the component is not displayed
//         • the implementation of the body is not loaded
//         • only the component stub is instantiated
function LayoutContainer(){};
LayoutContainer.prototype = {
    ....
    ....
};

// LayoutPane - One display frame (pane) managed by LayoutContainer
//     Usually, one component is internally arranged
//     When the display frame is opened for the first time, executable code of the component is loaded and
//     instantiated
function LayoutPane(){};
LayoutPane.prototype = {
        ....

// The display frame has opened
        onOpen: function(section){
                // If the component is already created, does nothing
                if(section.component){ return; }

// Gets a component frame
                var compFrame = section.getComponentFrame();

// Calls createComponent() of ComponentBase.js to crate the component
                section.component = compFrame.createComponent();
        }, // Highlights to notify message reception
        // Calls from notify() of ComponentBase.js
        highlight: function(){
            ....
        }
};
```

FIG. 9

```
// MyComponent - Implementation of a component body
//     Messages the component receives
//         • AddressChanged
//     Messages the component sends
//         • ItemSelected
function MyComponent(){};
MyComponent.prototype = {
    initialize: function(){ // Initializes
        // Monitors Address changed messages and calls handleAddress() if receiving any
        system.subscribe("AddressChanged", this.handleAddress);
    }, // Creates a GUI for the component
    create: function(){
        ....
    }, // The entity of a message send method
    fireItemSelected: function(selItem){
        // Sends a message to notify that an item has been selected
        system.publish("ItemSelected", selItem);
    }, // The entity of a message receive method
    handleAddress: function(message){
        // Updates with a message that has received the address field of the GUI
        this.addressField.value = message;
    }
};
```

FIG. 10

```
// MyComponentFrame - Component frame for MyComponent
//     Messages the component receives
//         • AddressChanged
//     Messages the component sends
//         • ItemSelected
//
//     Here, it is defined what kinds of messages MyComponent receives and sends. For example,
//     if the rules, such as that the method name beginning with "fire" is the message send method
//     and the method name beginning with "handle" is the message receive method, are decided,
//     all you have to do is prepare an empty method in order to enable you to define what kinds of
//     message send methods and receive methods you have. Since the entities of the message
//     send / receive methods are written over ComponentBase, the entities may be empty here as
//     long as defined.
function MyComponentFrame(){};
MyComponentFrame.prototype = new ComponentBase(); // Take Over ComponentBase // Message send method stub
MyComponentFrame.prototype.fireItemSelected = function(selItem){
};

// Message receive method stub
MyComponentFrame.prototype.handleAddress = function(message){
};
```

FIG. 11

```
// ComponentBase - Common module for component stubs
//    All the component stubs take over ComponentBase
function ComponentBase(){};
ComponentBase.prototype = {
    // If instantiated, the component stub is called from the system
    onLoad: function(){
        for(var prop in this){ // Check its (stub) property
            if(this.isSubscriber(prop)){ // If an event receive method
                this[prop] = function(e){ // Create the receive method in the stub
                    this.payloads[name] = e.payload; // Save the received message
                    this.notify(); // Notify the layout container of reception
                };
            }
        }
        this.payloads = {}; // Initializes the array for storage of the received message
    }, // Creates a component
    createComponent: function(){
        loadComponent(); // Loads implementation code of the component body
        var component = instantiateComponent(); // Instantiates the component body
        for(var prop in this){ // Check its (stub) property
            if(this.isSubscriber(prop)){ // If an event receive method
                this[prop] = function(e){ // create the receive method in the stub
                    component[prop](e); // call the receive method having the same name as the component body
                    this.notify(); // notify the layout container of reception
                };
            }
        }

// Initializes the component with the latest received message
        for(var name in this.payloads){ // for all the received message names
            component[name](this.payloads[name]); // Sets the value of the received message to the component
        }
        this.payloads = null; // Clear the array for storage of the received message
    }, // Notifies the reception of the message
    notify: function(){
        var pane = getCurrentPane(); // Gets a display frame to surround the component
        pane.highlight(); // Highlights
    }, // Determines whether to be the message receive method
    isSubscriber: function(prop){
        // If the name begins with "handle," consider it as the message receive method
        return (prop.indexOf("handle") == 0);
    }
}
```

FIG. 12

INFORMATION PROCESSING APPARATUS, EXECUTION METHOD, AND OBJECT PROGRAM

CROSS-REFERENCE TO RELATED APPLICATIONS

This application claims priority under 35 U.S.C. §119(a) to Japanese Patent Application Serial Number 2009-118654, filed May 15, 2009, entitled "INFORMATION PROCESSING APPARATUS, EXECUTION METHOD, AND OBJECT PROGRAM", the entirety of which is incorporated herein by reference.

FIELD OF THE INVENTION

The present invention relates to an information processing apparatus, an information processing method, and an information processing program.

BACKGROUND OF THE INVENTION

Use of the mashup technique has increased, which decomposes, as components, the functions necessary for an application and combines the multiple components so that the application can be built easily in a short period. In a mashup application, not only are the multiple component windows displayed at the same time, but also cooperation among components is defined to enable efficient operations on the application.

SUMMARY OF THE INVENTION

In the case of a platform, such as a mobile device, where the performance of the network, memory and central processing unit (CPU) is low, the device may be overloaded if the program code of multiple components is loaded upon starting the application to create instances. In order to reduce this load, each component is arranged on a display screen in the form of an icon or a foldable section without loading the component body upon starting the application so that each component can be selectively opened, loaded, and initialized in response to a request from a user. On the other hand, in order to establish cooperation among components, it is necessary to exchange messages among the components, and since this exchange usually requires program code of components to be loaded beforehand, conflicting the technique to reduce the load.

In order to solve the above problems, according to a first aspect of the present invention, there is provided an object program for executing a software component on a computer, and an information processing apparatus and method for the same, where the object program causing the computer to function as: a message storage unit for storing a message sent to the software component when executable code of the software component body has not been loaded; and an execution processing unit for loading the executable code of the software component body into the computer in response to receiving an execution instruction on the software component to run the executable code and process the message stored in the message storage unit prior to the execution instruction.

BRIEF DESCRIPTION OF THE DRAWINGS

FIG. 9 shows an example of pseudo program code of a layout container and a layout pane of the information processing apparatus 100 according to the embodiment.

FIG. 10 shows an example of pseudo program code of a component body according to the embodiment.

FIG. 11 shows an example of pseudo program code of a component frame of the information processing apparatus 100 according to the embodiment.

FIG. 12 shows an example of pseudo program code of a component base module of the information processing apparatus 100 according to the embodiment.

DETAILED DESCRIPTION OF THE INVENTION

Figure 1:
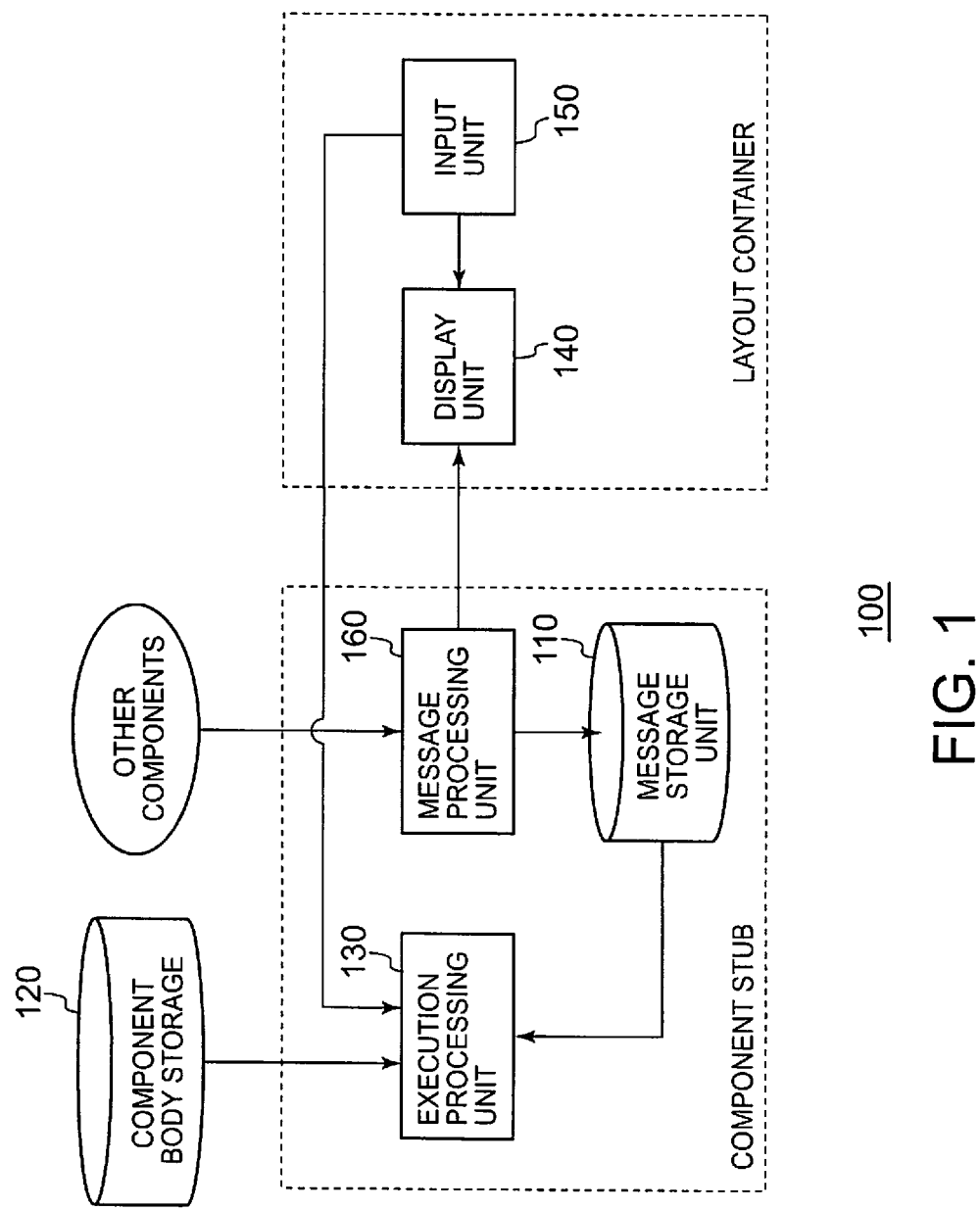
FIG. 1 is a block diagram showing an information processing apparatus 100 according to a preferred embodiment of the present invention.

FIG. 1 shows the configuration of an information processing apparatus 100 according to the embodiment. As an example, the information processing apparatus 100 is implemented by running an object program on a computer. The information processing apparatus 100 includes a message storage unit 110, a component body storage 120, an execution processing unit 130, a display unit 140, an input unit 150, and a message processing unit 160.

The message storage unit 110 stores messages sent to software components. Here, the software components may be various applications called gadgets or widgets, such as a phonebook application and a location information display application. Further, the messages are information sent to the software components. For example, the messages may be data and/or events directly or indirectly sent from a component to another component.

The component body storage 120 stores executable code of software component bodies. The component body storage 120 may be implemented by a storage device on a computer that controls the information processing apparatus 100, or a storage device on a remote computer or a server accessed by the computer through a network.

In response to receiving an execution instruction on a software component, the execution processing unit 130 loads executable code of the software component body into the computer to run the executable code and process the message stored in the message storage unit 110 prior to the execution instruction on the software component. Here, the execution processing unit 130 may give the message content to the software component body as processing parameters upon starting the execution of the software component body. Alternatively, the execution processing unit 130 may supply the message after starting the execution of the software component.

The display unit 140 shows objects corresponding to software components on a display screen of the computer. Here, the objects have representative elements or indicators (indicia), such as sections, icons, or tabs, and panes (display areas) which change the show/hide states by operating the indicators. The display unit 140 arranges the software components corresponding to the objects, respectively on the panes, and changes the show/hide states in conjunction with the showing/hiding of the panes.

The input unit 150 detects the user's manipulation of an object, and notifies it to the execution processing unit 130. Here, the object manipulation may be at least one of a click on the displayed object, drag-and-drop of the displayed object, and key input on a client device. In response to the user's manipulation of the object, the execution processing unit 130 may load and run executable code of a software component body corresponding to the object.

The message processing unit 160 receives a message sent to a software component, and changes the object display to a display indicating that the message has been received. Here, the executable code of the software component body corresponding to the object does not need to be loaded and/or run before the message processing unit 160 changes the object display. The message processing unit 160 may receive a message sent to the software component and change the object display to the display indicating that the message has been received on condition that the executable code of the software component body is not loaded.

Figure 2:
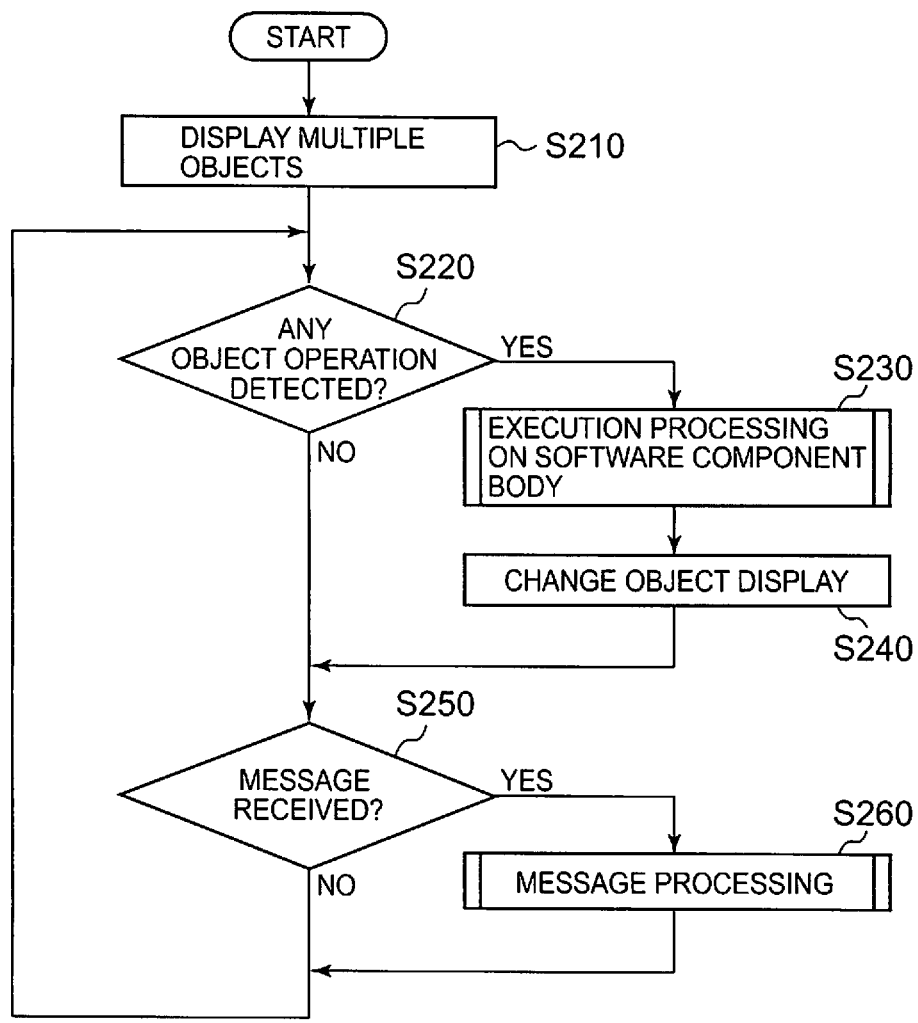
FIG. 2 is a flowchart showing an example of the operation of the information processing apparatus 100 according to the embodiment.

FIG. 2 shows an example of a flowchart of the information processing apparatus 100 according to the embodiment. First, the display unit 140 shows, on the display screen of the computer, multiple objects corresponding to software components, respectively (S210). At this time, the display unit 140 may put some or all of the objects into the hidden state.

Next, the input unit 150 detects whether the user has manipulated any object (S220). If detecting any object manipulation in step S220, the input unit 150 sends an execution instruction to the execution processing unit 130. The execution processing unit 130 performs the instruction execution processing according to the execution instruction (S230). The display unit 140 changes the object display corresponding to a software component on which the execution instruction has been received (S240). The display unit 140 may display an execution screen of the software component as part of the object. Further, in step S240, the display unit 140 may partially change the show/hide state of the object.

Next, the message processing unit 160 determines whether a message has been received (S250). If determined in step S250 that a message has been received, the message processing unit 160 performs message processing (S260).

Next, processing is returned to step S220. After that, processing steps S220 to S260 are repeated.

Figure 3:
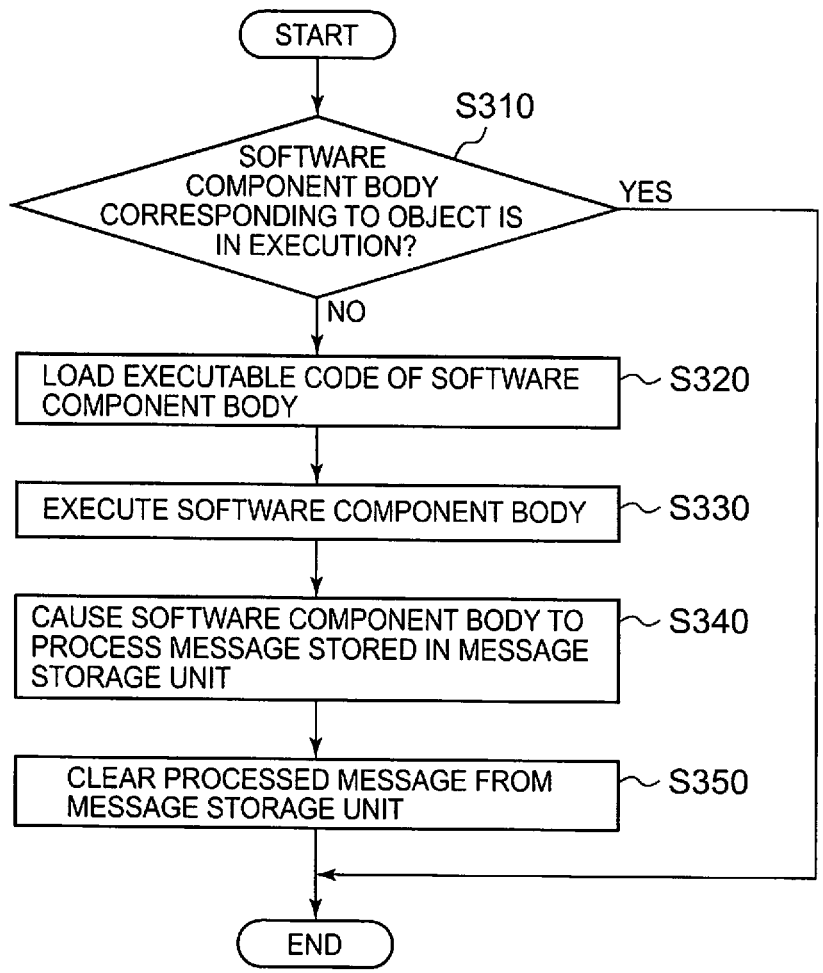
FIG. 3 is a flowchart showing an example of execution processing step S5230 performed by an execution processing unit 130 according to the embodiment.

FIG. 3 shows an example of a flowchart of execution processing step S230 performed by the execution processing unit 130 according to the embodiment. First, the execution processing unit 130 determines whether executable code of a software component body corresponding to the object the manipulation of which was detected has already been loaded and run (S310). If determined in step S310 that the executable code of the software component body has already been run, the execution processing unit 130 ends execution processing step S230.

On the other hand, if determined in step S310 that the executable code of the software component body has not been run yet (S310: No), the execution processing unit 130 loads the executable code of the software component body from the component body storage 120 (S320). Then, the execution processing unit 130 runs the executable code of the software component body (S330).

Then, the execution processing unit 130 causes the software component body to process the message stored in the message storage unit 110 (S340). After that, the execution processing unit 130 clears the message processed by the software component body (S350). When two or more software components share the message storage unit 110, the execution processing unit 130 may clear in step S340 only the message processed by the software component body.

Figure 4:
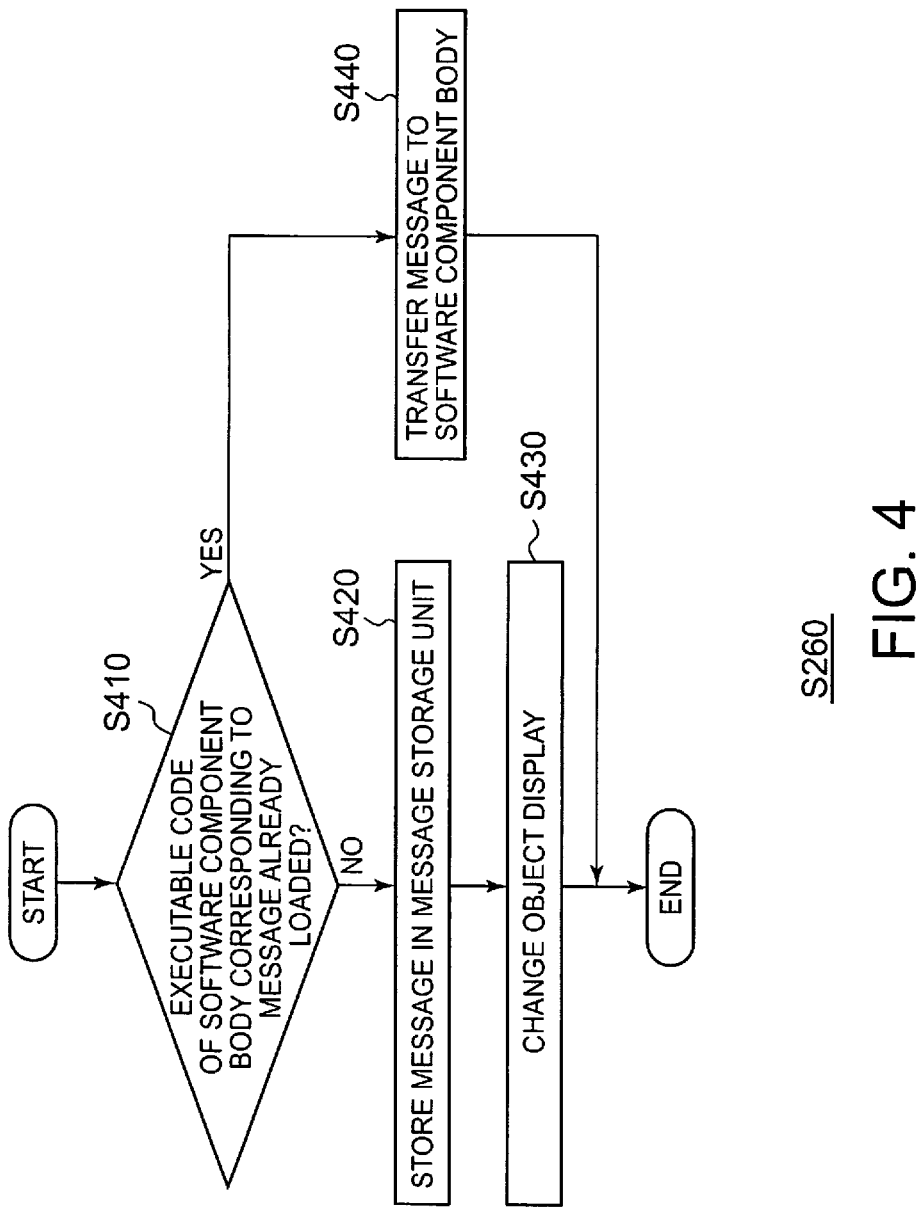
FIG. 4 is a flowchart showing an example of message processing step S260 performed by a message processing unit 160 according to the embodiment.

FIG. 4 shows an example of a flowchart of message processing step S260 performed by the message processing unit 160 according to the embodiment. The message processing unit 160 determines whether a message sent to the software component has been received and corresponding executable code of the software component body has already been loaded (S410).

If it is determined that the executable code of the software component body has not been loaded yet (S410: No), the message is stored in the message storage unit (S420). When two or more software components share the message storage unit 110, the message storage unit 110 may store the message sent to the software component in association with each software component. Then, the message processing unit 160 receives the message sent to the software component and changes the object display to a display indicating that the message has been received (S430). The message processing unit 160 may restore the display to that before receiving the message, after a predefined time period.

Further, the message processing unit 160 may receive all messages necessary for processing of the software component and change the object display to a display indicating that all the messages have been received. This enables the message processing unit 160 to show the user that the messages sent to the software component are accumulated.

Further, when the content of a predefined portion of a newly received message sent to the software component differs from the content of a corresponding portion of the message already stored in the message storage unit, the message processing unit 160 may change the object display to a display indicating that a message different in content has been received. In this case, if the message newly received is identical to the message already received, the message processing unit 160 does not change the display, and this enables the message processing unit 160 to present, to the user, that a new message has been received.

If determined that the executable code of the software component body has already been loaded (S410: Yes), the message processing unit 160 transfers the message to the software component body (S440).

Figure 5:
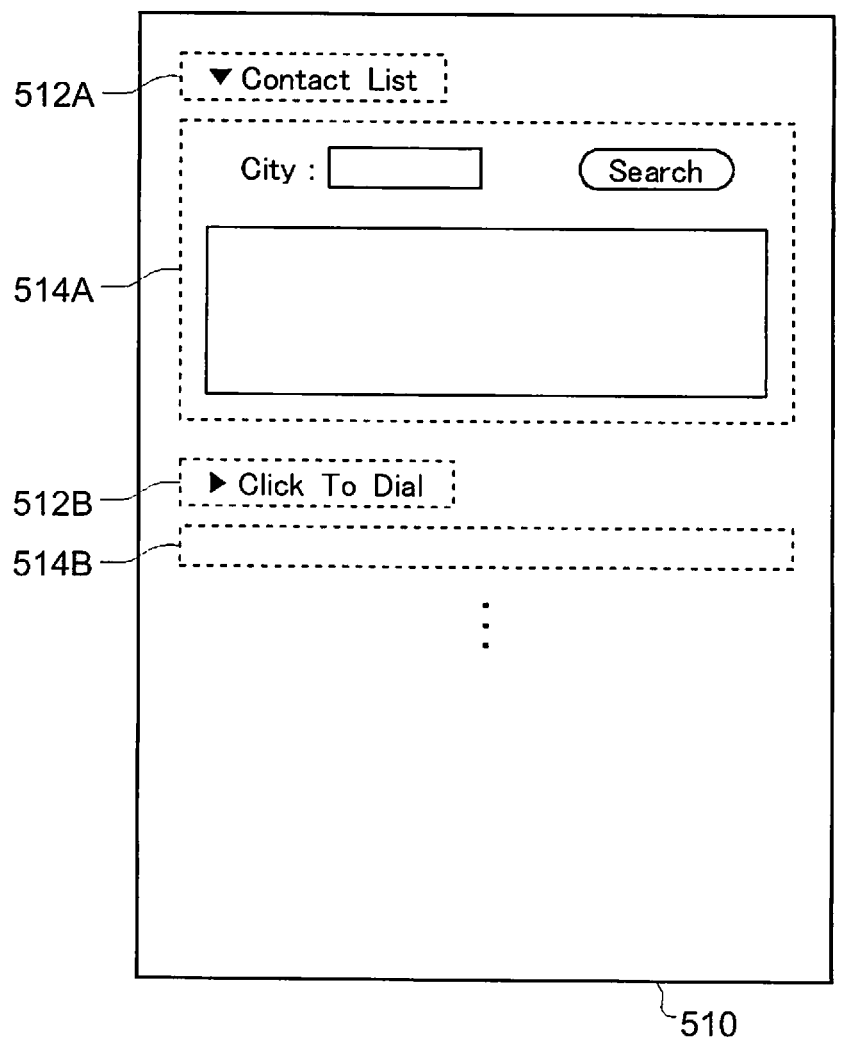
FIG. 5 shows a display screen 500 as an example of the display screen of a mashup application according to the embodiment.

FIG. 5 shows a display screen 500 as an example of the display screen of a mashup application according to the embodiment. The mashup application is an example of an entire application in which multiple software components to be executed by the computer work with one another. A layout container 510 implements the display unit 140 for showing the layout container 510 in the display screen 500. The layout container 510 shows, in the displayed layout container 510, section titles 512A-512B and layout panes 514A-514B as examples of objects for multiple components or component stubs, respectively.

When receiving a message as a result of implementation of the function of the message processing unit 160, the layout container 510 may highlight the section title 512A-512B of a corresponding component. This enables the layout container 510 to inform the user of a specific section title 512A-512B out of the multiple section titles currently displayed. Further, the layout container 510 puts the layout panes 514A-514B into the show or hide state. For example, in FIG. 2, layout pane 514A corresponding to "Contact List" section title 512A is in the show state. On the other hand, layout pane 514B corresponding to "Click To Dial" section title 512B is in the hide state.

Here, when the user clicks on the section title 512A-512B, the execution processing unit 130 determines whether executable code of a corresponding component body has already been loaded and run. If determined that the executable code of the corresponding component body has not been run yet, the execution processing unit 130 loads and runs the executable code of the corresponding component body.

The display unit 140 implemented by the layout container 510 shows a section list to change the show/hide state of a layout pane 514A-514B corresponding to a section title in response to user's clicking on the section title 512A-512B. Alternatively, the display unit 140 may display an icon panel to show a layout pane corresponding to an icon in response to user's clicking on the icon. Further, the display unit 140 may display a tab panel to show a layout pane corresponding to a tab in response to user's clicking on the tab.

Figure 6:
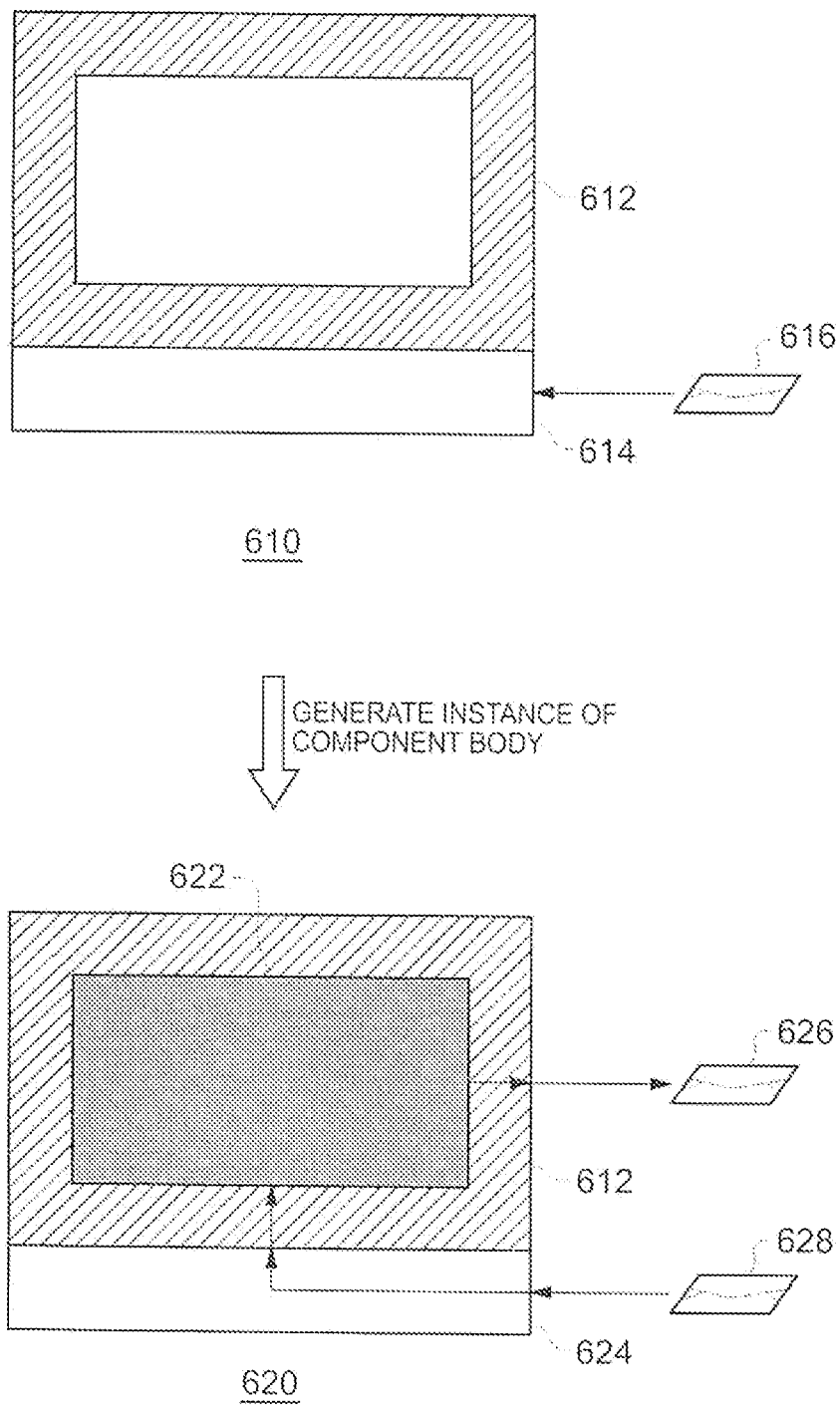
FIG. 6 shows a component stub 610 implementing a message storage unit 110, the execution processing unit 130, and the message processing unit 160, and a component 620 as an example of a software component according to the embodiment.

FIG. 6 shows a component stub 610 implementing the message storage unit 110, the execution processing unit 130, and the message processing unit 160, and a component 620 as an example of a software component according to the embodiment.

A component frame 612 defines send event and receive event of a corresponding component body. The send/receive event is an event that occurs when the corresponding component has sent or received a message.

A component base 614 may load and run executable code of a component body in response to receiving an execution instruction of the component during execution of the mashup application as a result of implementation of the function of the execution processing unit 130. Here, the component base 614 may initialize the component body upon running the executable code of the component body. Further, the component base 614 may instantiate the component body upon initializing the component body. The component base 614 may cause a component body to process a corresponding message stored in the message storage unit 110. After that, the component base 614 may clear the processed message stored in the message storage unit 110.

Further, the component base 614 may implement the function of the message processing unit 160 to receive a message 616, store the message 616 in the message storage unit 110, and notify the layout container that the message 616 has been received. Here, the message 616 may be sent by another component, or from a sender such as an OS and/or hardware.

The execution processing unit 130 implemented by the component base 614 creates an instance of the component body and incorporates the instance into a component stub 610, which makes the component stub 610 function as a component 620. The component 620 contains the component frame 612, an instance 622 of the component body, and a component base 624. Here, the instance 622 of the component body may send a message 626 according to the send/receive event definition of the component frame 612.

The component base 624 may receive a message 628, transfer the message 628 to the instance 622 of the component body, and notify the layout container 510 that the message 628 has been received. Here, the component base 624 may transfer the message 628 to the instance 622 of the component body according to the send/receive event definition of the component frame 612.

FIG. 7A, FIG. 7B, FIG. 7C, and FIG. 7D show an example of layout containers and corresponding display screens according to the embodiment. A layout container 710A is an example of a layout container after the mashup application is started to make a display screen 720A appear. The layout container 710A has a component stub 712 corresponding to "Contact List" component, a component stub 714 corresponding to "Click To Dial" component, and component stubs corresponding to the other components. At this point, executable code of any of the component bodies is not loaded, and any of the component bodies is not initialized.

Next, when the user clicks on a section title 722 corresponding to the "Contact List" component in the display screen 720A, the input unit 150 detects this operation. Then, the execution processing unit 130 implemented by the component base of the component stub 712 determines whether executable code of a corresponding body of the "Contact List" component has already been loaded. At this point, since executable code of the body of the "Contact List" component has not been loaded yet, the execution processing unit 130 loads and runs the executable code of the body of the "Contact List" component, and initialize the body of the "Contact List" component. As a result, since the execution processing unit 130 changes the component stub 712 to a component 716, the layout container 710A is changed to a layout container 710B.

Next, the display unit 140 implemented by the layout container 710A puts the display of a hidden layout pane 724 corresponding to "Contact List" section title 722 into the show state, changing the display screen 720A to a display screen 720B. At this point, executable code of the body of "Click To Dial" component is not loaded and a corresponding component body is not initialized.

Here, when the user selects an item in the layout pane 724, the corresponding component 716 sends a message 717 to the component stub 714 of the "Click To Dial" component defined beforehand to receive the item select event of the "Contact List" component. Here, the message 717 may contain information such as a name and a telephone number corresponding to the selected item.

Next, the message processing unit 160 implemented by the component base of the component stub 714 determines that the message 717 has been received. The message processing unit 160 then determines that executable code of the body of the "Click To Dial" component has not been loaded yet, and hence stores the message 717 in message storage unit 110. Thus, the layout container 710B shifts to a layout container 710C.

Next, the message processing unit 160 implemented by the component base of component stub 714 highlights "Click To Dial" section title 726 corresponding to the message 717 in order to indicate the reception of the message 717. Thus, the display screen 720B is changed to a display screen 720C. Even at this point, executable code of the body of the "Click To Dial" component is not loaded and the corresponding component body is not initialized.

Here, when the user clicks on the "Click To Dial" section title 726 in the display screen 720C, the input unit 150 detects this operation. Then, the execution processing unit 130 implemented by the component base of the component stub 714 determines whether the corresponding body of the "Click To Dial" component has already been run. At this point, since the body of the "Click To Dial" component has not been run yet, the execution processing unit 130 loads and runs executable code of the body of the "Click To Dial" component. As a result, since the execution processing unit 130 changes the component stub 714 to a component 718, the layout container 710C is changed to a layout container 710D.

Next, the execution processing unit 130 initializes the body of the "Click To Dial" component, and causes the body of "Click To Dial" component to process the message 717 already stored in the message storage unit 110. Further, the execution processing unit 130 clears the message 717 from the message storage unit 110. Here, the body of the "Click To Dial" component may receive information such as a name and a telephone number in the message 717 as processing parameters upon starting execution. Then, the display unit 140 implemented by the layout container 710D puts the display of a hidden layout pane 728 corresponding to the "Click To Dial" section title 726 into the show state, changing the display screen 720C to a display screen 720D. Thus, since the message storage unit 110 temporarily stores the message 717 sent to a component corresponding to the component body before the executable code of the component body is loaded and run, the information processing apparatus 100 can establish cooperation among components while reducing the load when loading the executable code of a component body corresponding to each component upon starting the mashup application.

FIG. 8A, FIG. 8B, FIG. 8C, and FIG. 8D show another example of layout containers and corresponding display screens according to the embodiment. In a display screen 820A of FIG. 8A, the display unit 140 implemented by layout containers 810A-810D differs from that in FIG. 7A in that multiple icons corresponding to multiple component tabs are displayed in a tiled layout.

Figure 7A:
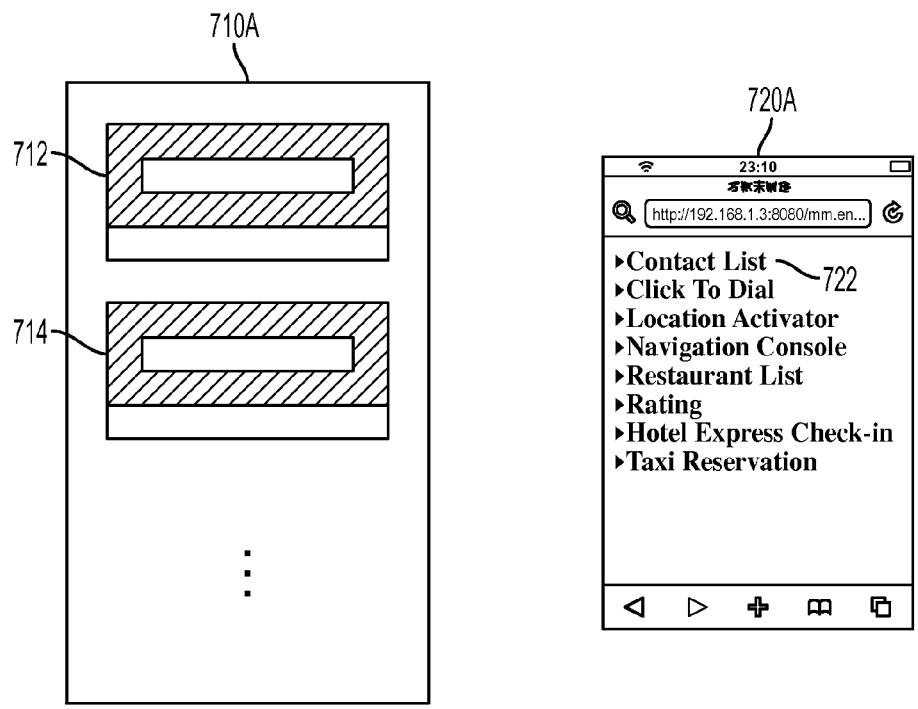
FIG. 7A shows an example of a layout container and its corresponding display screen according to the embodiment.
Figure 7B:
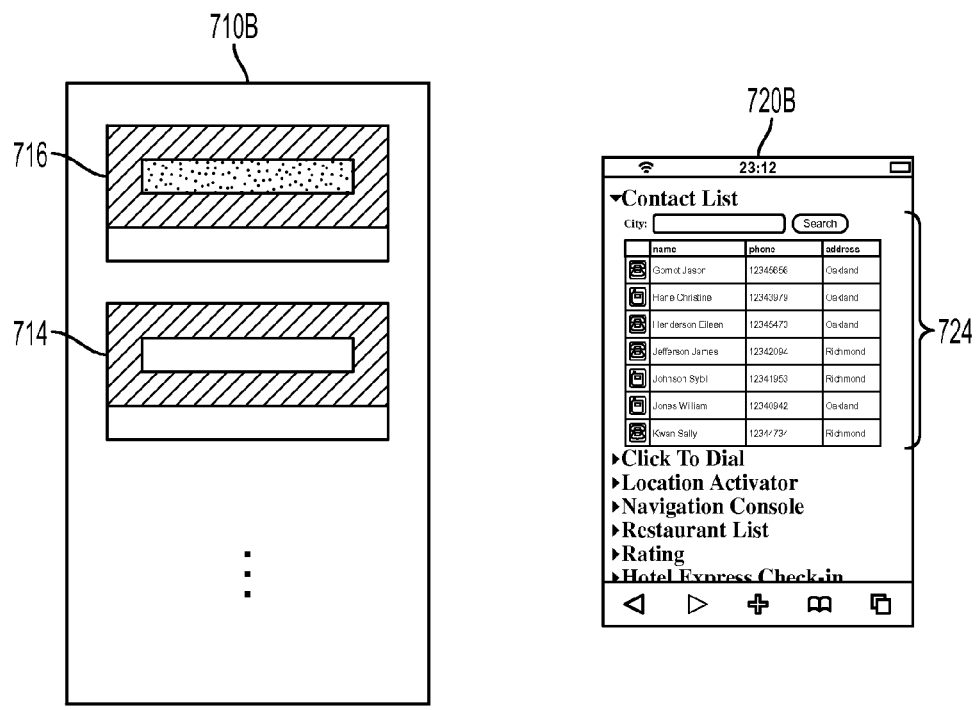
FIG. 7B shows an example of another layout container and its corresponding display screen according to the embodiment.
Figure 7C:
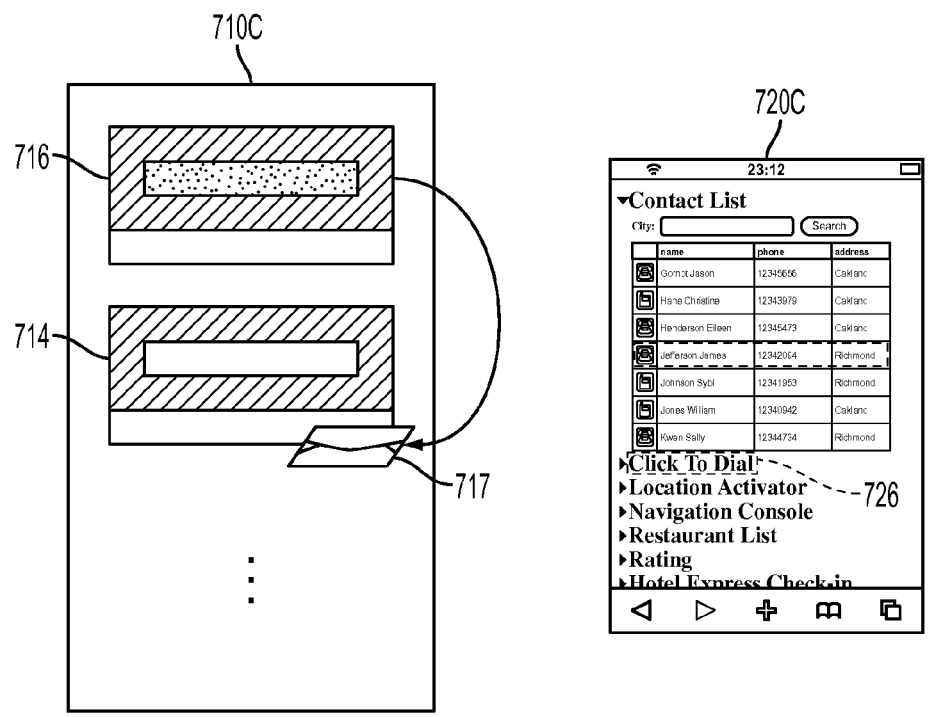
FIG. 7C shows an example of still another layout container and its corresponding display screen according to the embodiment.
Figure 7D:
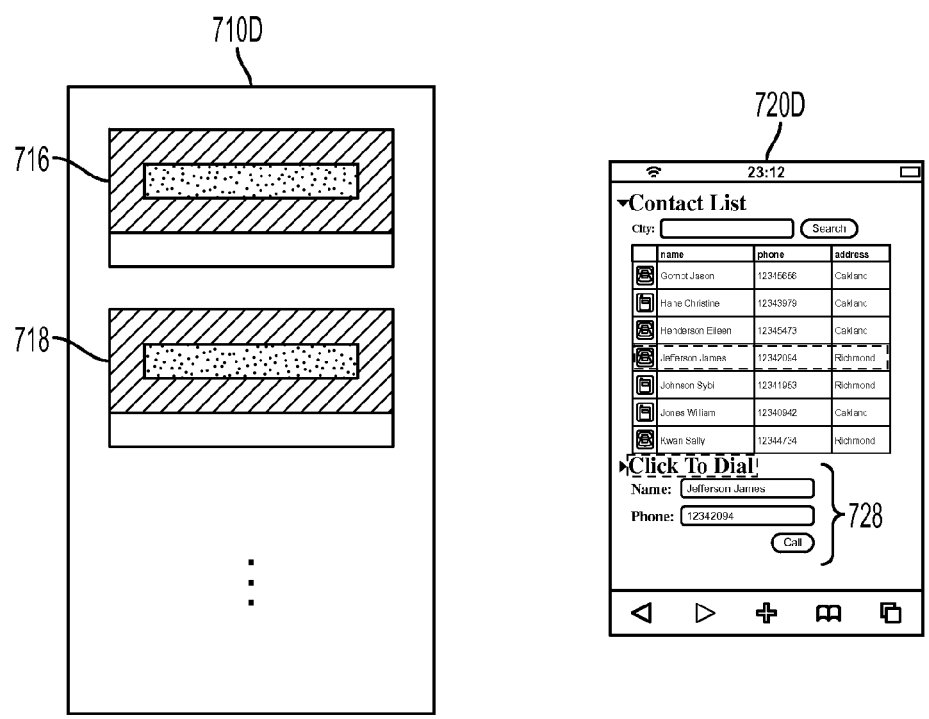
FIG. 7D shows an example of yet another layout container and its corresponding display screen according to the embodiment.
Figure 8A:
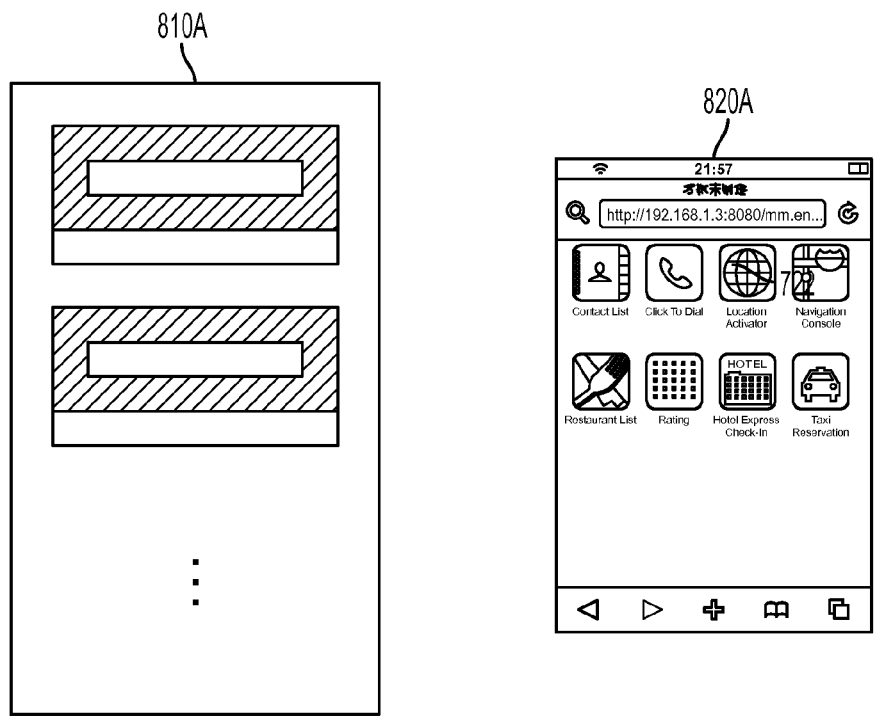
FIG. 8A shows another example of a layout container and its corresponding display screen according to the embodiment.
Figure 8B:
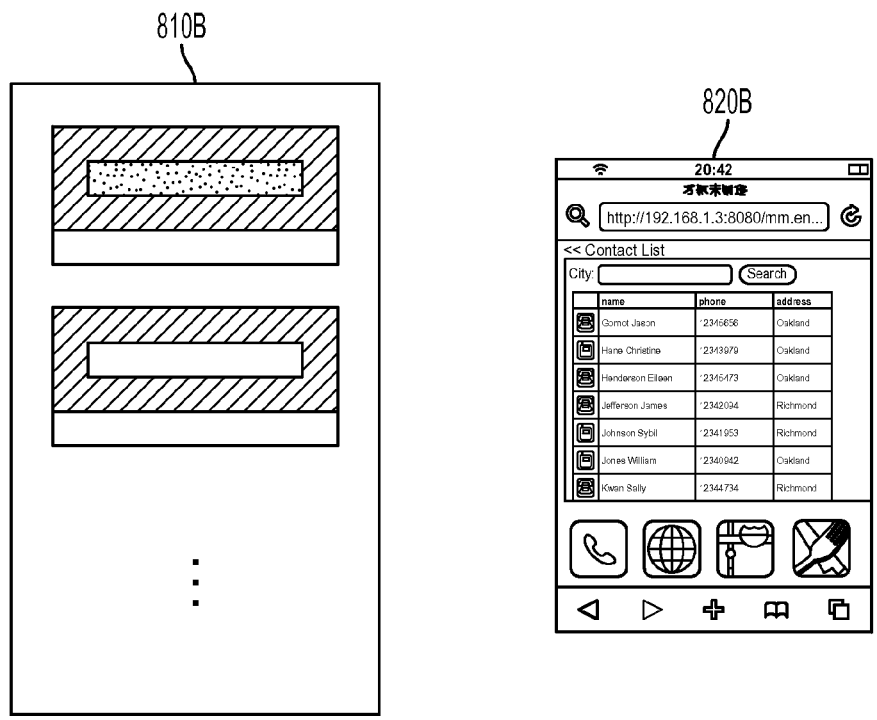
FIG. 8B shows another example of another layout container and its corresponding display screen according to the embodiment.
Figure 8C:
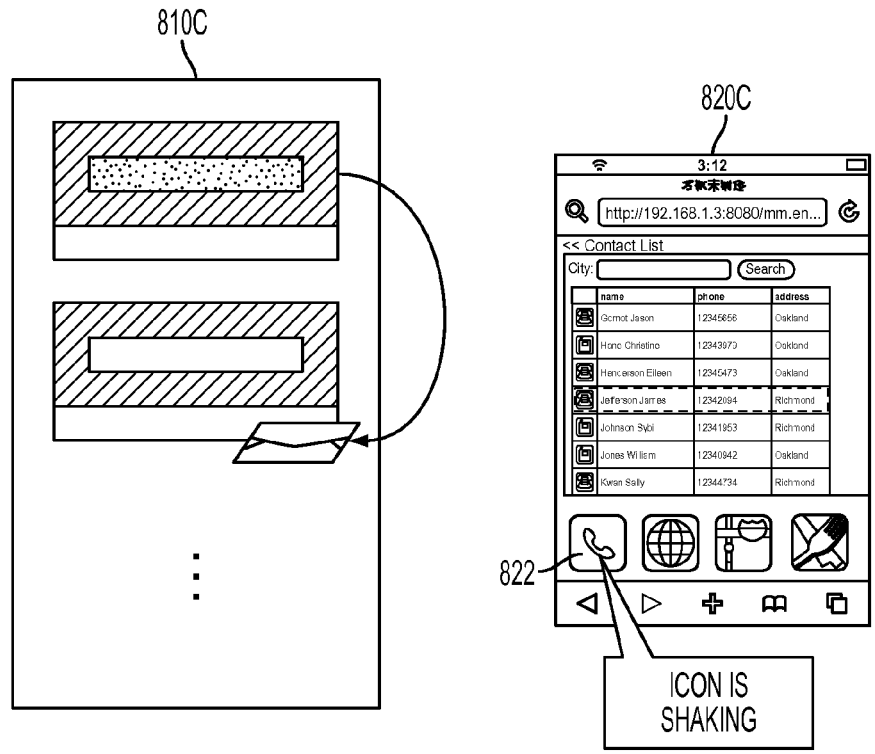
FIG. 8C shows another example of still another layout container and its corresponding display screen according to the embodiment.
Figure 8D:
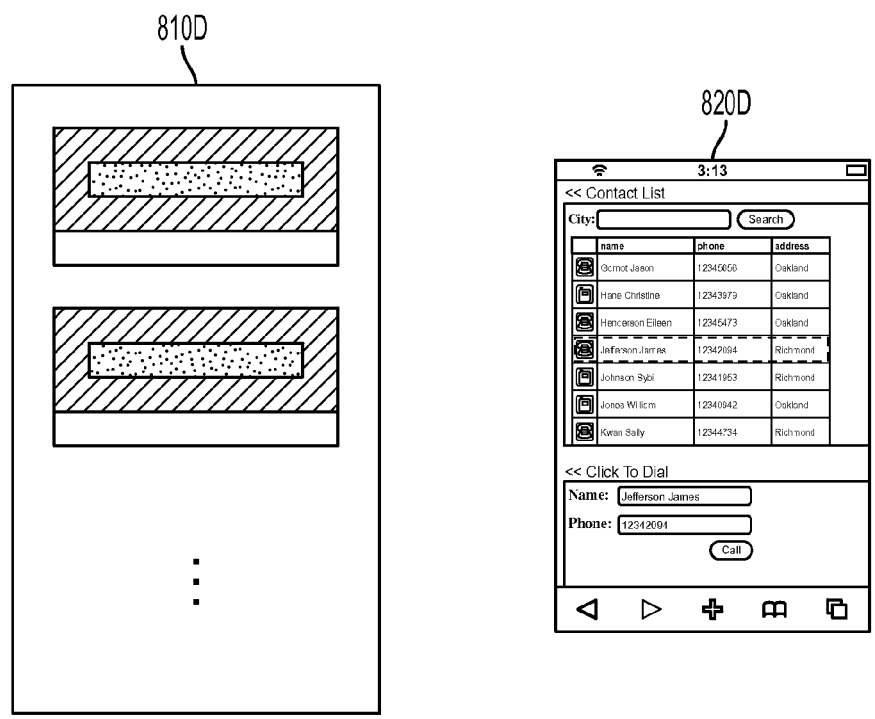
FIG. 8D shows another example of yet another layout container and its corresponding display screen according to the embodiment.

Further, in a display screen 820C of FIG. 8C, the message processing unit 160 differs from that in FIG. 7C in that "Click To Dial" icon 822 is shaking.

FIG. 9 shows an example of pseudo program code of a layout container and a layout pane of the information processing apparatus 100 according to the embodiment. The function on Open in the pseudo program code of the layout pane corresponds to part of processing performed by the execution processing unit 130 in step S230 of FIG. 2. FIG. 10 shows an example of pseudo program code of a component body according to the embodiment. The function create in the pseudo program code of the component body in FIG. 10 corresponds to part of processing performed by the execution processing unit 130 in step S230 of FIG. 2.

FIG. 11 shows an example of pseudo program code of a component frame of the information processing apparatus 100 according to the embodiment. By defining the component frame, a creator of the software component can readily define which message the software component should send and receive.

FIG. 12 shows an example of pseudo program code of a component base module of the information processing apparatus 100 according to the embodiment. The message processing unit 160 and the execution processing unit 130 may be implemented by running, on a computer, a common component base module for multiple software components. In this case, since the information processing apparatus 100 has only to load, into a memory of the computer, one component base module for multiple software components, memory usage can be reduced. Further, this makes it unnecessary to create a program corresponding to each component base separately for each software component, improving development efficiency.

Further, in response to loading of executable code of a software component body, the message processing unit 160 can replace a message receive routine for storing a message sent to the software component in the message storage unit 110 with a message receive routine for transferring the message to the software component body. This enables the software component to process the received message as a message directly sent from the outside. The pseudo program code in FIGS. 9 to 12 is described using JavaScript® language as an example, but the pseudo program code may be described in any other programming language.

Figure 13:
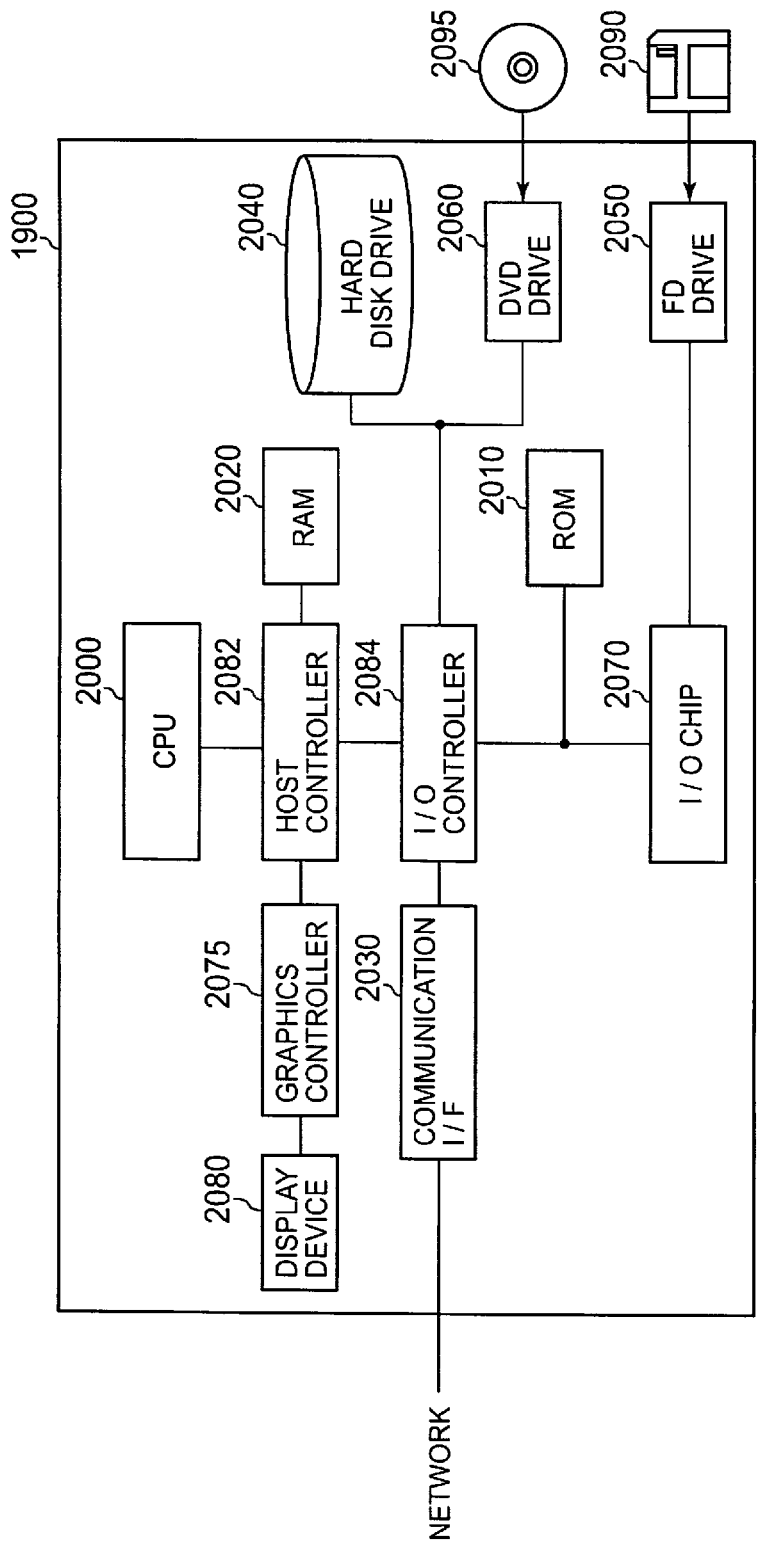
FIG. 13 is a block diagram showing an example of the hardware configuration of a computer 1900 according to the embodiment.

FIG. 13 shows an example of the hardware configuration of a computer 1900 according to the embodiment. The computer 1900 according to the embodiment includes: a CPU peripheral part having a CPU 2000, a RAM 2020, and a graphics controller 2075, which are connected with each other via a host controller 2082, and a display device 2080; an I/O part having a communication interface 2030, hard disk drive 2040, and a DVD drive 2060, which are connected to the host controller 2082 via an I/O controller 2084; and a legacy I/O part having a ROM 2010, a flexible disk drive 2050, and an I/O chip 2070, which are connected to the I/O controller 2084.

The host controller 2082 connects the RAM 2020, the CPU 2000 accessing the RAM 2020 at a high transfer rate, and the graphics controller 2075. The CPU 2000 operates based on programs stored in the ROM 2010 and the RAM 2020 to control each part. The graphics controller 2075 acquires image data generated by the CPU 2000 or the like on a frame buffer provided in the RAM 2020 to show the image data on the display device 2080. Alternatively, the graphics controller 2075 may include the frame buffer for storing image data generated by the CPU 2000 or the like.

The I/O controller 2084 connects the host controller 2082 with the communication interface 2030, the hard disk drive 2040, and the DVD drive 2060, as relatively high-speed I/O devices. The communication interface 2030 communicates with other devices through a network. The hard disk drive 2040 stores programs and data used by the CPU 2000 in the computer 1900. The DVD drive 2060 reads a program or data from a DVD 2095, and provides the hard disk drive 2040 with the program or data through the RAM 2020.

The ROM 2010, the flexible disk drive 2050, and the I/O chip 2070 as relatively low-speed I/O devices are connected to the I/O controller 2084. The ROM 2010 stores a boot program executed upon startup of the computer 1900, and/or programs and the like depending on the hardware of the computer 1900. The flexible disk drive 2050 reads a program or data from a flexible disk 2090, and provides the hard disk drive 2040 with the program or data through the RAM 2020. The I/O chip 2070 not only connects the flexible disk drive 2050 to the I/O controller 2084, but also connects various kinds of I/O devices to the I/O controller 2084 through a parallel port, a serial port, a keyboard port, a mouse port, etc.

The programs provided to the hard disk drive 2040 through the RAM 2020 are provided by the user in the form of being stored on recording media, such as the flexible disk 2090, the DVD 2095, or an IC card. The programs are read from the recording media, installed onto the hard disk drive 2040 in the computer 1900 through the RAM 2020, and run by the CPU 2000.

Programs installed on the computer 1900 to cause the computer 1900 to function as the information processing apparatus 100 include message storage unit module, a component body storage module, an execution processing module, an input module, a display module, and a message processing module. These programs or modules work with the CPU 2000 and the like to cause the computer 1900 to function as the message storage unit 110, the component body storage 120, the execution processing unit 130, the display unit 140, the input unit 150, and the message processing unit 160, respectively.

Information processes described in these programs or modules are read into the computer 1900 to function as the message storage unit 110, the component body storage 120, the execution processing unit 130, the display unit 140, the input unit 150, and the message processing unit 160 as specific means in which software and the above-mentioned various kinds of hardware resources are cooperated with each other. These specific means implement information computing and processing according to the intended use of the computer 1900, building the information processing apparatus 100 according to the intended use.

In one example, where the computer 1900 communicates with external devices, the CPU 2000 runs a communication program loaded on the RAM 2020, and instructs the communication interface 2030 to execute communication processes based on process contents described in the communication program. Under the control of the CPU 2000, the communication interface 2030 reads sent data stored in a send buffer area or the like provided in a storage device such as the RAM 2020, the hard disk drive 2040, the flexible disk 2090, or the DVD 2095, or writes received data received from a network to a receive buffer area or the like provided in the storage device. Thus, the communication interface 2030 may transfer sent/received data between storage devices via DMA (Direct Memory Access). Alternatively, the CPU 2000 may read data from a destination storage device or communication interface 2030 and write the data to a destination communication interface 2030 or storage device, thus transferring sent/received data.

Further, the CPU 2000 reads all or necessary part of data from among files or databases stored in the external storage devices, such as the hard disk drive 2040, the DVD drive 2060 (DVD 2095), and the flexible disk drive 2050 (flexible disk 2090), into the RAM 2020 via DMA transfer or the like to perform various kinds of processing on data on the RAM 2020. Then, the CPU 2000 writes the processed data back to the external storage devices via DMA transfer or the like. In such processing, the RAM 2020 is considered to temporarily store the contents of the external storage devices. In the embodiment, the RAM 2020 and the external storage devices are generically referred to as memories, storage part, or storage devices. The various kinds of information in the embodiment, such as various kinds of programs, data, tables, and databases, are stored in such storage devices as targets of information processing. The CPU 2000 can hold part of the RAM 2020 in a cache memory to perform read/write operations on the cache memory. Even in such a form, since the cache memory serves as part of the function of the RAM 2020, the cache memory is considered to be also included in the RAM 2020, the memories, and/or the storage devices unless otherwise distinguished.

Further, the CPU 2000 performs various kinds of processing described in the embodiment specified by a sequence of program instructions, such as various computations, information processing, conditional determination, and information search/replacement, on data read from the RAM 2020, and writes the processed data back to the RAM 2020. For example, in the case of conditional determination, the CPU 2000 determines whether various variables mentioned in the embodiment meet conditions such as being larger, smaller, not less, or not more than other variables or constants, and if any of the conditions is satisfied (or unsatisfied), processing branches to a different sequence of instructions or calls a subroutine.

The CPU 2000 can search for information stored in files or databases in the storage devices and the like. For example, when multiple entries with a second attribute value associated with a first attribute value, respectively, are stored in a storage device, the CPU 2000 searches for an entry that matches the condition specified by the first attribute value to read the second attribute value stored in the entry so that the second attribute value associated with the first attribute that meets the predetermined condition can be obtained.

The aforementioned programs or modules may be stored on external recording media. In addition to the flexible disk 2090 and the DVD 2095, the usable recording media include optical recording media such as CD, magneto-optical recording media such as MO, tape media, and semiconductor memories such as IC card. Further, the storage device such as the hard disk or RAM provided on a private communication network or a server system connected to the Internet may be used to provide the computer 1900 with the programs through the network.

The invention claimed is:

1. A computer program product comprising a computer usable storage device having an object program for executing a software component on a computer, the object program comprising:

computer usable program code for storing a message sent to the software component in a message storage unit;

computer usable program code for loading executable code of a body of the software component into a memory of the computer in response to receiving an execution instruction, subsequent to storing the message, running the executable code and processing the message stored in the message storage unit;

computer usable program code for showing an object associated with the software component on a display screen of the computer;

computer usable program code for loading and running the executable code of a software component body associated with the object into the memory of the computer in response to manipulation of the object by a user;

computer usable program code for changing a display of the object to indicate that the message has been received upon receiving a message sent to the software component on condition that the executable code of the software component body is not loaded; and computer usable program code for changing the object display to indicate that a message different in content has been received when a content of a predetermined portion of a newly received message sent to the software component differs from a content of a corresponding portion of the message already stored in the message storage unit.

2. The computer program product according to claim 1, wherein the object program further comprises computer usable program code for executing an entire application in which multiple software components work with one another and computer usable program code for, in response to receiving the execution instruction on one software component during execution of the entire application, loading executable code of the software component body into the computer, initializing and running the software component body.

3. The computer program product according to claim 1, wherein the object program further comprises computer usable program code for changing the object display to indicate that all the messages have been received upon receiving all messages necessary for processing of the software component.

4. The computer program product according to claim 1, wherein the object program further comprises computer usable program code for changing the object display to a display indicating that the message has been received and, after a predetermined time period, restoring the display to the display before receiving the message.

5. The computer program product according to claim 1, wherein the object program further comprises the computer usable program code for receiving the message sent to the software component and the computer usable program code for transferring the message to the software component body if the executable code of the software component body has already been loaded or storing the message in the message storage unit if the executable code of the software component body has not been loaded yet.

6. The computer program product according to claim 1, wherein the object program further comprises computer usable program code for, in response to loading the executable code of the software component body, replacing a message receive routine for storing the message sent to the software component in the message storage unit with a message receive routine for transferring the message to the software component body.

7. The computer program product according to claim 1, wherein the object program further comprises computer usable program code for running, on the computer, a common component base module for multiple software components.

8. An information processing apparatus for executing a software component, comprising:
   a computer with at least one processor and memory;
   a message storage unit to run on the computer, the message storage unit comprising program code enabled to store a message sent to the software component;
   a display unit configured for showing an object associated with the software component on a display screen of the computer;
   an execution processing unit to run on the computer, the execution processing unit comprising program code enabled to load executable code of a body of the software component into the memory of the computer in response to receiving an execution instruction, subsequent to storing the message, to run the executable code and to process the message stored in the message storage unit, the execution processing unit further comprises program code enabled to load and to run executable code of the software component body associated with the object in response to manipulation of the object by a user; and
   a message processing unit comprising program code enabled to receive the message sent to the software component and to change a display of the object to indicate that the message has been received on condition that the executable code of the software component body is not loaded and also to change the object display to indicate that a message different in content has been received when a content of a predetermined portion of a newly received message sent to the software component differs from a content of a corresponding portion of the message already stored in the message storage unit.

9. The information processing apparatus of claim 8, wherein the message processing section further comprises program code enabled to change the object display to indicate that all the messages have been received upon receiving all messages necessary for processing of the software component.

10. The information processing apparatus of claim 8, wherein the message processing section further comprises program code enabled to receive the message sent to the software component, to change the object display to a display indicating that the message has been received, and after a predetermined time period, to restore the display to the display before receiving the message.

11. The information processing apparatus of claim 8, wherein the message processing section further comprises program code enabled to receive the message sent to the software component, and to transfer the message to the software component body if the executable code of the software component body has already been loaded, or to store the message in the message storage unit if the executable code of the software component body has not been loaded yet.

12. The information processing apparatus of claim 8, wherein in response to loading the executable code of the software component body, the message processing section further comprises program code enabled to replace a message receive routine for storing the message sent to the software component in the message storage unit with a message receive routine for transferring the message to the software component body.

* * * * *